United States Patent [19]

Markezich et al.

[11] 4,238,597

[45] Dec. 9, 1980

[54] PROCESS FOR PRODUCING COPOLYESTER-CARBONATES

[75] Inventors: Ronald L. Markezich; Clayton B. Quinn, both of Mt. Vernon, Ind.

[73] Assignee: General Electric Company, Pittsfield, Mass.

[21] Appl. No.: 33,393

[22] Filed: Apr. 26, 1979

[51] Int. Cl.³ .............................................. C08G 63/64
[52] U.S. Cl. ................................... 528/179; 521/182; 521/189; 525/439; 525/461; 528/173; 528/176; 528/190; 528/191; 528/193; 528/194; 528/370; 528/371; 528/372
[58] Field of Search ............... 528/173, 176, 179, 190, 528/191, 193, 194, 370, 371, 372; 521/182, 189; 525/439, 461

[56] References Cited

U.S. PATENT DOCUMENTS

| | | |
|---|---|---|
| 3,028,364 | 4/1962 | Conix et al. .......................... 528/173 |
| 3,030,331 | 4/1962 | Goldberg ............................. 528/176 |
| 3,169,121 | 2/1965 | Goldberg ............................. 528/193 |
| 3,989,672 | 11/1976 | Vestergaard ......................... 528/196 |
| 4,156,069 | 5/1979 | Prevorsek et al. .................... 528/176 |

FOREIGN PATENT DOCUMENTS 2714544  3/1977  Fed. Rep. of Germany .

OTHER PUBLICATIONS

Prevorsek et al., *Synthesis of Poly(ester Carbonate)-Copolymers,* Allied Chemical Corporation, Corporate Research Center, 4/79.

*Primary Examiner*—Lester L. Lee
*Attorney, Agent, or Firm*—William F. Mufatti

[57] ABSTRACT

A process is disclosed for producing copolyester-carbonates employing diacid chlorides and following a pH processing profile. The copolyester-carbonates produced exhibit physical properties similar to those of high molecular weight aromatic polycarbonates.

18 Claims, No Drawings

PROCESS FOR PRODUCING COPOLYESTER-CARBONATES

This invention is directed toward a novel process for obtaining copolyester-carbonates using diacid chlorides and employing a pH profile.

BACKGROUND OF THE INVENTION

Various methods for the preparation of copolyester-carbonates are described in U.S. Pat. Nos. 3,030,331, 3,169,121 and 3,207,814, all of which are hereby incorporated by reference. In addition, copending application Ser. No. 755,352, now abandoned, assigned to the same assignee as this case, discloses a method for preparing polyester carbonates by an interfacial polymerization process wherein the copolymers obtained contain both carboxylate and carbonate groups. Further, copending application Ser. No. 844,285, now U.S. Pat. No. 4,130,548 also assigned to the same assignee as this case, discloses a method for preparing copolyester-carbonates from a mixed polyanhydride ester of a dicarboxylic acid and a halogen carbonic acid ester of a polyhydroxy compound.

While these prior art methods are useful, they are not completely satisfactory as they either involve complex chemical reactions and costly equipment, or require expensive starting materials, or are time consuming and, therefore, uneconomical to manufacture.

DESCRIPTION OF THE INVENTION

It has now been found that the shortcomings of prior art procedures employed to obtain copolyester-carbonates can be overcome or minimized by the process of this invention. In general, the process of the invention comprises reacting in a suitable solvent system at a first pH level of about 9–12, preferably 10–11, a dihydric phenol, an acid dichloride and 2–4 mole % phenol to form a reaction medium, the molar ratio of the dihydric phenol to the acid dichloride being in the range of about 90:10–55:45, preferably 85:15–70:30; adding a chain stopper to the reaction medium in an amount of about 2–4 mole % and adjusting the pH of the reaction medium to a second level of about 4–7, preferably 5–6; adding a carbonate precursor to the reaction medium and adjusting its pH to a third level of about 9–12, preferably 10–11; continuing the addition of the carbonate precursor until the reaction is complete; and, recovering from the solvent system a copolyester-carbonate.

Adjustment of the pH of the reaction medium to its different levels can be accomplished by the use of suitable, inert solutions. For example, the base pH levels can be obtained and controlled by adding an aqueous caustic solution whereas the acid pH level is controlled by adding either more acid dichloride or phosgene.

Production of the copolyester-carbonate employing the foregoing process is accomplished in a relatively short time. For example, initial reaction of the reactants at the first pH level of 9–12 can be achieved in about 10–15 minutes, reaction time at the second pH 5–6 level can be achieved in about 4–8 minutes, and the final reaction at the second pH 9–12 level can be achieved in about 15–25 minutes. Thus, overall reaction time of the process can be about 30–60 minutes which is significantly faster than that realized in the prior art processes mentioned above. Furthermore, all of the reactants are readily available and require no additional purification prior to use so that the process, in addition to being highly efficient, is also economical.

The dihydric phenols that can be employed in the practice of this invention are bisphenols such as bis(4-hydroxyphenyl)methane, 2,2-bis(4-hydroxyphenyl)propane (bisphenol-A), 2,2-bis(4-hydroxy-3-methylphenyl)propane, 4,4-bis(4-hydroxyphenyl)heptane, 2,2-bis (4-hydroxy-3,5-dichlorophenyl)propane, 2,2-bis(4-hydroxy-3,5-dibromophenyl)propane, etc.; dihydric phenol ethers such as bis(4-hydroxyphenyl)ether, bis(3,5-dichloro-4-hydroxyphenyl)ether, etc.; dihydroxydiphenyls such as p,p'-dihydroxydiphenyl, 3,3'-dichloro-4,4-dihydroxydiphenyl, etc.; dihydroxyaryl sulfones such as bis(4-hydroxyphenyl)sulfone, bis(3,5-dimethyl-4-hydroxyphenyl)sulfone, etc.; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc.; and dihydroxy diphenyl sulfoxides such as bis(4-hydroxyphenyl)sulfoxide, bis(3,5-dibromo-4-hydroxyphenyl)sulfoxide, etc. A variety of additional dihydric phenols are also available such as are disclosed in U.S. Pat. Nos. 2,999,835, 3,028,365 and 3,153,008. Also suitable are copolymers prepared from the above dihydric phenols copolymerized with halogen-containing dihydric phenols such as 2,2-bis(3,5-dichloro-4-hydroxyphenyl)propane, 2,2-bis(3,5-dibromo-4-hydroxyphenyl)propane, etc. It is also possible to employ two or more different dihydric phenols or a copolymer of a dihydric phenol with a glycol or with hydroxy or acid terminated polyester, or with a dibasic acid as well as blends of any of the above materials.

The acid dichlorides that can be employed are both the aromatic and the saturated, aliphatic dibasic acids. The saturated, aliphatic dibasic acids which can be employed are derived from straight chain paraffin hydrocarbons, such as oxalic, malonic, dimethyl malonic, succinic, glutaric, adipic, pimelic, suberic, azelaic and sebacic acid and the halogen-substituted aliphatic dibasic acids. Aliphatic carboxylic acids containing hetero atoms in their aliphatic chain, such as thio-diglycollic or diglycollic acid can also be used as well as unsaturated acids such as maleic or fumaric.

Suitable examples of aromatic and aliphatic aromatic dicarboxylic acids which can be used are phthalic, isophthalic, terephthalic, homophthalic, o-, m-, and p-phenyl-enediacetic acid; the polynuclear aromatic acids such as diphenic acid, 1,4-naphthalic acid, and 2,6-napthalic acid. Preferred acid dichlorides are isophthaloyl dichloride (IPCl$_2$), and terephthaloyl dichloride (TPCl$_2$) as well as mixtures thereof.

The copolyester-carbonates of this invention are prepared by employing a molecular weight regulator, i.e., a chain stopper, an acid acceptor, a carbonate precursor, and a catalyst. The chain stoppers that can be employed include monohydric phenols such as phenol, chroman-I, paratertiarybutylphenol, parabromophenol, primary and secondary amines, etc. Preferably, phenol is employed as the chain stopper.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The carbonate precursor employed can be either a carbonyl halide, a carbonate ester or a haloformate. The carbonyl halides which can be employed are carbonyl bromide, carbonyl chloride and mixtures thereof. Typical of the carbonate esters that can be employed are diphenyl carbonate, di-(halophenyl) carbonates such as di-(chlorophenyl) carbonate, di-(bromophenyl) carbonate, di-(tri-chlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The catalysts which can be employed can be any of the suitable catalysts that aid the polymerization of the bisphenol-A and the acid dichloride with phosgene. Suitable catalysts include tertiary amines such as triethylamine, tripropylamine, N,N-dimethylaniline, quaternary ammonium compounds such as tetraethylammonium bromide, cetyl triethylammonium bromide, tetra-n-heptylammonium iodide, tetra-n-propylammonium bromide, tetramethylammonium chloride, tetramethylammonium hydroxide, tetra-n-butylammonium iodide, benzyl-trimethylammonium chloride and quaternary phosphonium compounds such as n-butyl-triphenyl phosphonium bromide and methyltriphenyl phosphonium bromide.

The solvent system employed is one in which the reactants can be accepted but which is inert with respect to the reactants. For example, an aqueous organic solvent system can be employed wherein the organic member can readily accept the reactants, but be inert to them. Exemplary of such organic members are methylene chloride, chlorobenzene, cyclohexanone, carbon tetrachloride, and the like. Preferably, the organic portion of the solvent system is methylene chloride.

Also included herein are branched copolyester-carbonates wherein a polyfunctional aromatic compound is reacted with the dihydric phenol, the carbonate precursor and the acid dichloride to provide a thermoplastic randomly branched copolyester-carbonate.

These polyfunctional aromatic compounds contain at least three functional groups which are carboxyl, carboxylic anhydride, haloformyl or mixtures thereof. Examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. Preferred polyfunctional aromatic compounds are trimellitic anhydride or trimellitic acid, or their haloformyl derivatives.

Also included herein are blends of a linear and a branched copolyester-carbonate.

By employing the process of the invention, the physical properties of the copolyester-carbonates produced can be modified to stress one or more desired properties by controlling the amount of chain stopper employed. For example, copolyester-carbonates having improved heat distortion temperatures, improved tensile strength, and the like, can be readily obtained and yet the overall physical properties of these copolymers are similar to those of a high molecular weight aromatic polycarbonate. Details of the invention will become more apparent from a consideration of the following examples which are set forth to illustrate the best mode currently known to practice the invention. In the examples parts and percentages are by weight unless otherwise stated.

EXAMPLE 1

Polymerization of Polyester-Carbonate Using Isophthaloyl Dichloride

To a ten gallon reactor was added 1826 g (8 moles) BPA (2,2'-bis(4-hydroxyphenyl)propane), 7 liters of methylene chloride, 5.5 liters of water, 28 ml (2 mole %) of triethylamine as catalyst and 3.4 g of sodium gluconate. At pH 9–10, 406 g (2 moles) of isophthaloyl dichloride ($IPCl_2$) in one liter of methylene chloride was added over a 12 minute period while controlling the pH with 35% aqueous caustic. Phenol (28.23 g, 3 mole %) was added, the pH was lowered to 5–6 by the introduction of phosgene and additional phosgene was then delivered at 36 g/min. for another five minutes. The pH was adjusted to 11 and phosgenation continued at 36 g/min. for 17 minutes while controlling the pH at 11 with 35% aqueous caustic. The solution was diluted with 5 liters of methylene chloride and worked up in the usual manner to afford a white powder. The resin was stabilized with standard stabilizing amounts of a phosphite and an epoxide as disclosed in German Pat. No. 1,694,285.

EXAMPLE 2

Physical Properties of Copolyester-Carbonates Employing Different Levels of Acid Dichloride and Chain Stoppers Following the process described in Example 1, additional copolyester-carbonates were obtained except that the mole percent of isophthaloyl dichloride and the mole percent of phenol chain stopper were varied. Each of the copolymer resins obtained in powdered form was then fed to an extruder operating at a temperature of about 500° F. to extrude the resin into strands and the extruded strands were chopped into pellets. The pellets were then injection molded at about 600° F. into test samples measuring about $3'' \times 2'' \times \frac{1}{8}''$.

The intrinsic viscosity (IV) of the resins was determined in methylene chloride at 25° C. and their melt index (MI) was determined by modified ASTM D-1238. Heat distortion temperature under load (DTUL) of the molded samples, with and without a commercial glass filler, was determined according to ASTM D-648. The molded samples containing the glass filler were obtained in the same manner as described above except that the glass filler in an amount of 9% by weight of the copolymer resin was mixed with the copolymer resin powder by tumbling the ingredients together in a laboratory tumbler prior to extruding the mixture. The results obtained are set forth in Table I below, wherein "$IPCl_2$" identifies the isophthaloyl dichloride and "CS" identifies the chain stopper.

TABLE I

Physical Properties of Copolyester-Carbonates Containing Different Levels of Acid Dichloride and Chain Stopper

| Sample | Mole % IPCl$_2$ | CS (%) | IV (dl/g) | MI | DTUL (°F.) at 264 psi | 9% Glass DTUL (°F.) at 264 psi |
|---|---|---|---|---|---|---|
| A | 0 | 3 | 0.5 | 6.4 | 270 | 281 |
| B | 10 | 2 | 0.66 | 2.71 | 275 | — |
| C | 15 | 3 | 0.52 | 4.5 | 279 | 295 |
| D | 20 | 3 | 0.52 | 3.94 | 281 | — |
| E | 25 | 3 | 0.49 | 4.46 | 285 | — |
| F | 30 | 2.5 | 0.53 | 2.09 | 290 | — |
| G | 30 | 3 | 0.47 | 3.52 | 289 | 303 |
| H | 30 | 3 | 0.47 | 4.18 | 289 | 307 |
| I | 30 | 3 | | 3.88 | 292 | — |
| J | 30 | 3.5 | 0.44 | 6.38 | 285 | — |
| K | 40 | 2 | 0.58 | 1.27 | 293 | — |

As can be seen from the results set forth in Table I above, DTUL values of the copolyester-carbonates increase as the mole percent of IPCl$_2$ increases and this increase appears to be independent of the percent of chain stopper employed. In addition, increased DTUL values are obtained in molded samples containing 9 weight percent glass.

Additional properties of Samples B-K were also determined and the results obtained are set forth in Table II wherein the various tests employed were as follows:

Yellowness Index (YI) was determined according to ASTM D-1925 on samples molded at 600° F.;

Notched Izod (NI) and Unnotched Izod (UNI) impact on the ⅛" thick molded samples were determined according to ASTM D-256;

Flexural Yield (FY) and Flexural Modulus (FM) were determined according to ASTM D-790.

In Table II, samples C', G' and H' correspond to samples C, G and H except that they contain 9% by weight glass filler.

TABLE II

Additional Physical Properties of Copolyester-Carbonates Containing Different Levels of Acid Dichloride and Chain Stopper

| Sample | YI | NI (ft lb/in) | UNI (ft lb/in) | Gardner Impact | FY (psi × 10$^{-3}$) | FM (psi × 10$^{-3}$) |
|---|---|---|---|---|---|---|
| B | 7.0 | 16.6 | >40 | >480 | 14.3 | 330 |
| C | 6.9 | 15.9 | — | — | — | — |
| D | 5.0 | 14.2 | — | 400 | 14.6 | 338 |
| E | 6.3 | 13.6 | — | — | — | — |
| F | 5.5 | 12.8 | — | 400 | 14.9 | 322 |
| G | 6.7 | 12.0 | >40 | 400 | — | — |
| H | 6.3 | 8.5 | — | >480 | — | — |
| I | 6.4 | 12.3 | — | — | — | — |
| J | 6.3 | 7.3 | — | 430 | — | — |
| K | 7.7 | 11.0 | — | >480 | 16.7 | 379 |
| C' | — | 1.8 | — | — | — | — |
| G' | — | 1.5 | 23.3 | 180 | 16.5 | 486 |
| H' | — | 1.4 | — | 150 | — | — |

The results in Table II above indicate that notched Izod values slightly decrease as IPCl$_2$ mole percent increases whereas unnotched Izod values appear to be unaffected. Flexural yield and flexural modulus both appear to increase as the IPCl$_2$ mole percent increases.

The samples containing 9% by weight glass reveal a general decreased in notched and unnotched Izod, but a general increase in flexural yield and flexural modulus as the percent of IPCl$_2$ increases.

EXAMPLE 3

Polymerization of Polyester-Carbonate Using Terephthaloyl Dichloride

To a ten gallon reactor was added 1824 g (8 moles) of BPA, 7 liters of methylene chloride, 5.5 liters of water, 28 ml (2 mole %) of triethylamine as catalyst, and 3.4 g of sodium gluconate. At pH 9-10, 406 g (2 moles) of terephthaloyl dichloride (TPCl$_2$) in 1.5 liters of methylene dichloride was added over a 9 minute period while controlling the pH with 35% aqueous caustic. Phenol (28.23 g, 3 mole %) was added, the pH was lowered to 5-6, and then phosgene was delivered at 36 g/min. for 5 minutes. The pH was then adjusted to 11 and phosgenation continued at 36 g/min. for 18 minutes while controlling the pH at 11 with 35% aqueous caustic. The solution was diluted with 5 liters of methylene chloride and worked up in the usual manner to afford a white powder. The resin was stabilized as in Example 1 above.

EXAMPLE 4

Physical Properties of Copolyester-Carbonate Using Different Levels of Terephthaloyl Dichloride and Chain Stopper Following the procedures described in Example 2, the physical properties of the TPCl$_2$-based copolyester-carbonate of Example 3 were obtained and the results are shown in Table III below wherein samples M' and R' contained 9% by weight glass filler.

TABLE III

| Sample | Mole % TPCl$_2$ | CS (%) | IV (dl/g) | MI | DTUL (°F.) at 264 psi | DTUL (°F.) at 66 psi | YI | NI (ft lb/in) | UNI (ft lb/in) | Gardner Impact |
|---|---|---|---|---|---|---|---|---|---|---|
| M | 10 | 3 | 0.58 | 3.02 | 280 | — | 6.3 | 15.3 | — | 400 |
| N | 10 | 3 | 0.58 | 2.99 | 278 | — | 7.9 | 15.2 | — | — |
| O | 20 | 2 | 0.77 | 0.48 | 295 | 311 | 11.8 | 12.0 | — | 400 |
| P | 20 | 3 | 0.59 | 1.70 | 289 | 302 | 6.7 | 12.0 | — | 400 |
| Q | 20 | 4 | 0.48 | 4.41 | 279 | 297 | 6.6 | 10.0 | — | 400 |
| R | 22 | 3 | 0.59 | 1.46 | 289 | — | 10.2 | 10.5 | >40 | 400 |
| S | 25 | 3 | 0.60 | 1.31 | 292 | — | 9.5 | 9.5 | — | — |
| T | 30 | 3 | 0.50 | 0.93 | 293 | — | hazy | 4.5 | — | 300 |
| M' | 10 | 3 | 0.58 | — | 295 | — | — | 2.6 | — | — |
| R' | 22 | 3 | 0.58 | — | 304 | — | — | 3.8 | >39 | 240 |

The results in Table III above reveal that DTUL generally increases with an increase in TPCl$_2$ concentration. Color stability (YI) appears to deteriorate with an increase in melt index (MI) whereas impact properties appear to improve at the lower TPCl$_2$ concentrations. The addition of 9% by weight glass filler appears to improve DTUL, but adversely affects impact properties.

In addition, copolyester-carbonates prepared from TPCl$_2$ had generally higher molecular weights than those prepared from isophthaloyl dichloride (IPCl$_2$) (Table I).

EXAMPLE 5

Comparison of Copolyester-Carbonates Prepared From Isophthaloyl Dichloride (IPCl$_2$) and Terephthaloyl Dichloride (TPCl$_2$)

The DTUL properties at different molecular weights of various copolyester-carbonates prepared from isophthaloyl dichloride (IPCl$_2$) as in Example 2 were compared with those prepared from terephthaloyl dichloride (TPCl$_2$) as in Example 4. The results are shown in Table IV below wherein the sample identified as "Control" did not contain either IPCl$_2$ or TPCl$_2$.

TABLE IV

| | IPCl$_2$ | | | | TPCl$_2$ | | |
|---|---|---|---|---|---|---|---|
| Sample | Mole % IPCl$_2$ | DTUL (°F.) at 264 psi | MI | Sample | Mole % TPCl$_2$ | DTUL (°F.) at 264 psi | MI |
| Control | 0 | 270 | 6.40 | Control | 0 | 270 | 6.40 |
| B | 10 | 275 | 2.71 | M | 10 | 280 | 3.02 |
| C | 15 | 279 | 4.50 | — | — | — | — |
| D | 20 | 281 | 3.94 | P | 20 | 289 | 1.70 |
| E | 25 | 285 | 4.46 | S | 25 | 292 | 1.31 |
| H | 30 | 289 | 4.18 | T | 30 | 293 | 0.93 |

The results in Table IV above indicate that DTUL values generally increase with increased concentrations of either isophthaloyl dischloride (IPCl$_2$) or terephthaloyl dichloride (TPCl$_2$).

EXAMPLE 6

Polymerization of Copolyester-Carbonate Using a Mixture of Isophthaloyl Dichloride and Terephthaloyl Dichloride To a ten gallon reactor vessel was added 1712 g (7.5) moles of BPA, 7 liters of methylene chloride, 5.5 liters of water, 28 ml (2 mole %) of triethylamine as catalyst, and 3.4 g of sodium gluconate. At pH 9–10, 426.3 g (2.1 moles) of isophthaloyl dichloride (IPCl$_2$) and 81.2 g (0.4 mole) of terephthaloyl dichloride (TPCl$_2$) in one liter of methylene chloride were added over a four minute period while controlling the pH with 35% aqueous caustic. Phenol (28.23 g, 3 mole %) was added, the pH was lowered to 5-6, and then phosgene was delivered at 36 g/min. for five minutes. The pH was adjusted to 11 and phosgenation continued at 36 g/min. for 19 minutes while controlling the pH at 11 with 35% aqueous caustic. The solution was diluted with 3 liters of methylene chloride and worked up in the usual manner to afford a white powder. The resin was stabilized as in Example 1 above.

EXAMPLE 7

Following the procedure of Example 6, several copolyester-carbonates were prepared containing a mixture of IPCL$_2$ and TPCl$_2$ wherein the molar ratio of IPCl$_2$:TPCL$_2$ was varied from 100:0 to 0:100 while retaining the molar concentration of the sum of IPCL$_2$/TPCl$_2$ constant at 25/75. Samples of these IPCL$_2$/TPCL$_2$ copolyestercarbonates were obtained following the procedure of Example 2. The physical properties of these samples were determined and the results obtained are set forth in Table V below.

TABLE V

Physical Properties of 25/75, IPCl$_2$/TPCl$_2$, Copolyester-Carbonates with Varying Molar Ratios of IPCl$_2$/TPCl$_2$

| Sample | Molar Ratio IPCl$_2$:TPCl$_2$ | CS (%) | DTUL (°F.) at 264 psi | MI |
|---|---|---|---|---|
| U | 100:0 | 3 | 285 | 4.46 |
| V | 85:15 | 3 | 287 | 3.72 |
| W | 75:25 | 3 | 287 | 3.03 |
| X | 50:50 | 3 | 290 | 2.38 |
| Y | 25:75 | 3 | 290 | 1.65 |
| Z | 0:100 | 3 | 292 | 1.31 |

EXAMPLE 8

The same procedures were followed as in Example 7 to determine the physical properties of additional samples of copolyestercarbonates containing a mixture of IPCl$_2$ and TPCl$_2$ and a constant 3% chain stopper except that both the molar ratios and the molar concentrations of IPCl$_2$ and TPCl$_2$ were varied. The results are set forth in Table VI below.

TABLE VI

Physical Properties of Copolyester-Carbonates Containing IPCl$_2$ and TPCl$_2$ at Various Concentrations and Molar Ratios

| Sample | Molar Ratio IPCl$_2$:TPCl$_2$ | Molar Concentration (%) | | IV (dl/g) | MI | DTUL (°F.) at 264 psi | YI | NI (ft lb/in) |
|---|---|---|---|---|---|---|---|---|
| | | IPCl$_2$ | TPCl$_2$ | | | | | |
| A' | 100:0 | 25.00 | 0 | 0.49 | 4.46 | 285 | 6.3 | 13.6 |
| B' | 85:15 | 21.25 | 3.75 | 0.51 | 3.72 | 287 | 6.0 | 12.9 |
| C' | 75:25 | 18.75 | 6.25 | — | 3.03 | 287 | 6.0 | 12.9 |
| D' | 50:50 | 12.50 | 12.50 | — | 2.38 | 290 | 6.6 | 12.2 |
| E' | 25:75 | 6.25 | 18.75 | 0.55 | 1.65 | 290 | 7.8 | 10.8 |
| F' | 0:100 | 0 | 25.00 | 0.60 | 1.31 | 292 | 9.5 | 9.5 |

The results in Tables V and VI above indicate that while DTUL increases 7° F. going from 100:0 to 0:100 IPCl$_2$:TPCl$_2$ molar ratios, melt index increases about 3.5 times. When the IPCl$_2$:TPCl$_2$ molar ratio is greater than 70:30, DTUL increases only 3° F. but melt index increases 2.3 times. On the other hand, when the IPCl$_2$:TPCl$_2$ molar ratio is less than 70:30, melt index increases only 1.5 times with a concurrent 3° F. increase in DTUL.

As can be seen from the foregoing examples, copolyester-carbonates can be prepared by the process of the invention so that they exhibit desired physical properties. Importantly, the process of the invention permits these copolyester-carbonates to be prepared more economically and faster than current methods of preparation.

What is claimed is:

1. A process for producing copolyester-carbonates comprising:

reacting in a solvent system at a first pH level of about 9-12 a dihydric phenol, an acid dichloride and phenol to form a reaction medium, the molar ratio of said dihydric phenol to said acid dichloride being in the range of about 90:10-55:45;

adding a chain stopper to said reaction medium;

adjusting the pH of said reaction medium to a second pH level of about 4-7;

adding a carbonate precursor to said reaction medium;

adjusting the pH of said reaction medium to a third pH level of about 9-12;

continuing the addition of said carbonate precursor until said reaction is complete; and recovering from said solvent system a copolyester-carbonate.

2. The process of claim 1 wherein said solvent system is an inert, aqueous system containing an organic member selected from the group consisting of methylene chloride, chlorobenzene, cyclohexanone and carbon tetrachloride.

3. The process of claim 2 wherein said organic member is methylene chloride.

4. The process of claim 1 wherein said dihydric phenol is bisphenol-A.

5. The process of claim 1 wherein said acid dichloride is a member selected from the group consisting of isophthaloyl dichloride, terephthaloyl dichloride, and mixtures thereof.

6. The process of claim 1 wherein said molar ratio is in the range of about 85:15-70:30.

7. The process of claim 1 wherein said chain stopper is phenol.

8. The process of claim 7 wherein said phenol is added in an amount of about 2-4 mole %.

9. The process of claim 1 wherein said carbonate precursor is phosgene.

10. The process of claim 1 wherein said first and third pH levels are at about 10-11 and said second pH level is at about 5-6.

11. The process of claim 1 wherein the reaction time at said first pH level is about 10-15 minutes, the reaction time at said second pH level is about 4-8 minutes, and the reaction time at said third pH level is about 15-25 minutes.

12. A process for producing copolyester-carbonates comprising:

reacting in an inert, aqueous solvent system containing an organic member at a first pH level of about 9-12, a dihydric phenol, an acid dichloride and phenol to form a reaction medium, said acid dichloride being a member selected from the group consisting of isophthaloyl dichloride, terephthaloyl dichloride, and mixtures thereof, the molar ratio of said dihydric phenol to said acid dichloride being in the range of about 90:10-55:45 and said organic member being selected from the group consisting of methylene chloride, chlorobenzene, cyclohexanone and carbon tetrachloride;

adding a chain stopper to said reaction medium in an amount of about 2-4 mole %;

adjusting the pH of said reaction medium to a second pH level of about 4-7;

adding a carbonate precursor to said reaction medium and adjusting the pH thereof to a third pH level of about 9-12;

continuing the addition of said carbonate precursor until said reaction is complete; and recovering from said solvent system a copolyester-carbonate.

13. The process of claim 12 wherein the organic member in said solvent system is methylene chloride.

14. The process of claim 12 wherein said dihydric phenol is bisphenol-A.

15. The process of claim 12 wherein said molar ratio is in the range of about 85:15-70:30.

16. The process of claim 12 wherein said chain stopper is phenol and said carbonate precursor is phosgene.

17. The process of claim 12 wherein said first and third pH levels are at about 10-11 and said second pH level is at about 5-6.

18. The process of claim 12 wherein the reaction time at said first pH level is about 10-15 minutes, the reaction time at said second pH level is about 4-8 minutes, and the reaction time at said third pH level is about 15-25 minutes.

* * * * *